United States Patent [19]

Clapp et al.

[11] Patent Number: 4,734,733

[45] Date of Patent: Mar. 29, 1988

[54] CAMERA WITH TWO POSITION STROBE

[75] Inventors: Roger C. Clapp, Wellesley; George D. Whiteside, Lexington, both of Mass.

[73] Assignee: Polaroid Corporation, Cambridge, Mass.

[21] Appl. No.: 98,981

[22] Filed: Sep. 21, 1987

[51] Int. Cl.⁴ ............................................. G03B 15/03
[52] U.S. Cl. .................................. 354/414; 354/419; 354/149.11
[58] Field of Search .................. 354/414, 419, 149.11, 354/413

[56] References Cited

U.S. PATENT DOCUMENTS

| | | | |
|---|---|---|---|
| 3,855,601 | 12/1974 | Uchiyama et al. | 354/419 X |
| 4,130,356 | 12/1978 | Yamanaka | 354/145 |
| 4,166,680 | 9/1979 | Maitani | 354/126 |
| 4,174,898 | 11/1979 | Iijima | 354/145 |
| 4,331,400 | 5/1982 | Brownstein | 354/414 |
| 4,452,520 | 6/1984 | Kaplan | 354/126 |
| 4,472,042 | 9/1984 | Iwata et al. | 354/419 X |
| 4,515,453 | 5/1985 | Wakabayashi et al. | 354/149.11 X |
| 4,556,303 | 12/1985 | Martin | 354/141 |
| 4,609,269 | 9/1986 | Kamata | 354/149.11 |
| 4,666,280 | 5/1987 | Miyawaki et al. | 354/414 |

OTHER PUBLICATIONS

Photographic Trade News vol. 50 No. 17 Sep. 8, 1986 p. 3.

Primary Examiner—W. B. Perkey
Attorney, Agent, or Firm—Alfred E. Corrigan

[57] ABSTRACT

A photographic camera having a source of artificial illumination mounted for automatic movement from a first operative fill flash position to a second operative position. In its second position, the intensity of its illumination is greater than in the first position and its axis of illumination is spaced further away from the camera's objective lens axis than in the first position.

18 Claims, 6 Drawing Figures

CAMERA WITH TWO POSITION STROBE

BACKGROUND OF THE INVENTION

1. Field of the Invention

This invention relates to a camera having a source of artificial illumination mounted for automatic movement from a first operative position wherein it assumes a low profile attitude to a second operative position.

2. Description of the Prior Art

The present invention relates to a photographic camera having a source of artificial illumination, e.g. a variable output strobe, which is mounted for automatic movement from a first operative position to a second operative position in response to predetermined condition(s) which exist at the scene to be photographed. In the first position of the source of artificial illumination, its output is relatively low, e.g., twenty-five precent of its maximum output, and is used basically to fill in areas of the scene which may not be fully illuminated by the ambient light. In the second position of the source of illumination, its output is increased so as to compensate for low ambient light intensity, e.g., 10 candles/foot$^2$ or less, at the scene, or to counter the adverse effects of a scene which is predominately back-lit, i.e., the intensity of the ambient background light is greater than that of the ambient foreground light.

Cameras having a source of artificial illumination mounted for movement from a first position to a second position are well known in the art. For example, U.S. Pat. No. 4,452,520 shows a folding camera having a pop-up strobe which automatically moves from a first inoperative position to a second operative position as the camera sections or housings are moved into their extended operative postions. U.S. Pat. Nos. 4,174,898 and 4,130,356 show cameras having pop-up strobes which move in a vertical direction to their operative positions in response to a manual actuation of a release button. Also, see U.S. Pat. No. 4,166,680 wherein a strobe is attached to a side of a camera for manual pivotal movement between two operative positions. Finally, an article on page 3 of Vol. 50 No. 17 of the Sept. 8, 1986 edition of the Photographic Trade News describes a camera having a built-in flash which pops up automatically when needed. However, none of the foregoing cameras are provided with a source of artificial illumination which is mounted for automatic movement from one operative position to a second operative position to provide a fill flash function in the one operative position and a greater flash intensity or full flash function in the second operative position.

SUMMARY OF THE INVENTION

The instant invention relates to a photographic camera having a source of artificial illumination, e.g., a variable output strobe or a multiple lamp flash array in which one or more of the lamps may be fired during an exposure, and more particularly to such a camera wherein the source of artificial illumination is mounted on the camera for automatic movement from a first operative position to a second operative position in response to predetermined ambient light condition(s) which exist at the scene to be photographed.

Normally, the source of artificial illumination is releasably maintained in its first position by a solenoid controlled latch. Thus located, its axis of illumination is relatively closely adjacent to the optical axis of the camera, and thus the size of the camera is minimized. Generally, such juxtaposition of the two axes might possibly create an undesirable phenomenon commonly referred to as "red eye" when color film is being exposed. This "red eye" phenomenon is considered to be at least partially attributable to the incidence into the camera's objective of the red light reflected from the retina in the eyeball of a person being illuminated by the source of artificial illumination. In other words, the "red eye" problem is, in part, a function of the spacing between the emission axis of the source of illumination and the optical axis of the camera's objective. It is also believed that the "red eye" phenomenon is related to the intensity of the artificial light which strikes the retina and is reflected back into the objective lens. Thus, the appearance of "red eye" in a color photograph appears to be more readily apparent to the viewer with an increase in the intensity of the artificial illumination upon the subject eyeball. However, in the instant invention, even though the axes of the objective lens and the source of artificial illumination are relatively close when the latter is in the first position, the effects of "red eye", if any, are minimized by providing a relatively low intensity light output by the source. Further, the ambient light level is at a relatively high level when the source of artificial illumination is in the first position thus resulting in a generally smaller diameter of the subject's pupils with its attendant reduction in the amount of artificial light striking the retinas.

The camera includes a system for measuring the intensity of the ambient light at the scene to be photographed, and it may also include means for determining if the scene is back-lit or not. This system is connected to the aforementioned solenoid such that it causes the latter to be momentarily energized when (1) the intensity of the ambient light falls below a predetermined value, e.g., ten candles per square foot, or (2) the scene is back-lit, i.e., the intensity of the background light is greater than that of the foreground. When the solenoid is momentarily energized, it pulls a latch out of latching engagement with the source of artificial illumination thus permitting a spring to automatically move the latter into a second position. In its second position, the source of artificial illumination is connectable with camera circuitry which will enable the intensity of its illumination to be increased from, e.g., 25% of maximum intensity when in said first position to as much as 100% of full flash in the second position. The aforementioned "red eye" phenomenon is of little if any consequence because the distance between the axes of the camera's objective lens and the source of artificial illumination is greater in the second position than in the first position. If the photographer subsequently enters an environment wherein the intensity of the ambient light is again above 10 candles/ft$^2$, he may leave the source of artificial illumination in the second position wherein its level of illumination would be close to 25% of maximum or he has merely to push the source of artificial illumination back into its first position.

An object of the invention is to provide a camera with a source of artificial illumination which is mounted for automatic movement from a first operative position to a second operative position in response to predetermined conditions existing at a scene to be photographed.

Another object of the invention is to provide a camera with a source of artificial illumination having a relatively low output in a first position and a relatively higher output in a second position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and object of the invention, reference should be had to the following detailed description taken in connection with the accompanying drawings wherein.

DETAILED DESCRIPTION OF THE INVENTION

Figure 1:
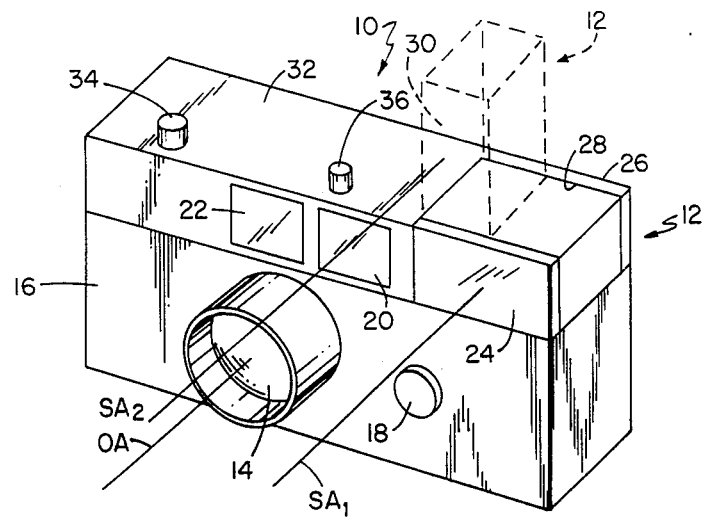
FIG. 1 is a perspective view of a camera having a source of artificial illumination mounted for pivotal movement between solid and broken line positions.

Reference is now made to FIG. 1 of the drawings wherein is shown a preferred embodiment of the invention. Specifically, FIG. 1 shows a camera 10 having a source of artificial illumination 12 mounted for automatic pivotal movement from a first operative position (solid line), wherein its axis of illumination $SA_1$ is relatively close to and substantially parallel with the optical axis OA of the camera's objective lens 14, to a second operative position (broken line), wherein its axis $SA_2$ is spaced a greater distance from the optical axis OA than in said first position.

The camera 10 includes a front wall 16 in which the objective lens 14 is mounted. Also located in the front wall 16 is a transducer 18 for determining the camera-to-subject distance, a viewfinder window 20, and a photocell window 22. The front wall 16 also includes a generally rectangular section 24 which together with a rear wall 28 defines a recess or a chamber 28 for nestably receiving the source of artificial illumination 12 when it is in the first position. Thus located, the source of artificial illumination 12 lies within the confines of the camera's exterior walls and thus minimizes the size of the camera when so located. The front wall section 24 is capable of transmitting light and is preferably formed (1) from a transparent material having light diffusing zones or alternatively a translucent material or (2) as a filter. Further, a forwardly facing side 30 of the source of artificial illumination may be open or it may be closed by a light diffusible wall.

A top wall 32 of the camera 10 includes, in addition to the chamber 28, an exposure initiation button 34 and a film rewind button 36.

Figure 1A:
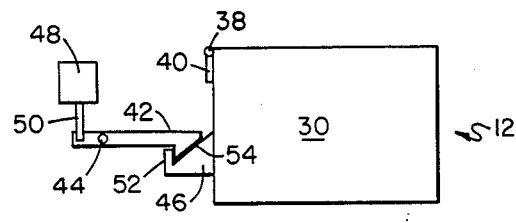
FIG. 1a is a schematic representation of an arrangement for releasably latching the source of artificial illumination in its first position.

The source of artificial illumination is releasably maintained in its first position by a solenoid controlled latch arrangement, as shown in FIG. 1a. In this arrangement, the source of artificial illumination 12 is mounted for pivotal movement about a hinge 38 into its second position under the bias of a spring 40. The source of artificial illumination 12 is releasably maintained in its first position via the engagement between a latch 42 pivotally connected to the camera 10 by a pin 44, and a latch plate 46 which is attached to a wall of the source 12. A solenoid 48 has its armature 50 coupled to one end of the latch 46 such that upon energization of the solenoid 48 the armature 50 is momentarily extended thus causing counterclockwise rotation of the latch 42 and the release of the source 12 for movement into its second position.

In the operation of the camera shown in FIG. 1, and assuming that the source of artificial illumination 12 is in the first position, the photographer views and frames his subject and then depresses the exposure initiation button 34 into a first stage position. With the button 34 in the first stage position, ambient light being reflected from the scene enters the photocell window 22 and strikes a photocell assembly (not shown) which is a part of the camera's exposure control system. Circuitry in the exposure control system compares the output of the photocell assembly with a predetermined value for ambient scene light intensity e.g., ten candles/ft$^2$. If the output of the photocell assembly indicates a value representative of an ambient light intensity less than ten candles/ft$^2$, it causes the solenoid 48 to be momentarily energized, thus releasing the source of artificial illumination 12 for pivotal movement into its second position under the influence of the spring 40. Suitable means (not shown) are provided for stopping the source 12 when it enters the second position. If the output of the photocell assembly is representative of a value equal to or greater than ten candles/ft$^2$ but the scene being measured is back-lit, the solenoid 48 is also momentarily energized thus releasing the source of artificial illumination 12 for movement into its second position. Thus, when the scene is back-lit or its ambient light intensity is below a predetermined value, the source of artificial illumination 12 is in the second position where its output may be increased from, e.g., 25% of maximum when in the first position to upwards of 100% of the source's 12 maximum output, such increased output may be of a fixed value or may be dependent upon certain measured variables such as camera-to-scene distance and/or intensity of ambient scene light which may be received by the exposure control system. With the source of artificial illumination 12 now in the second position, the photographer may further depress the button 34 to initiate photographic exposure. Obviously, if the scene is not back-lit, or if the ambient light intensity at the scene is greater than ten candles/ft$^2$, the source of artificial illumination 12 will remain latched in its operative first position wherein, with its reduced output, it will function as a fill flash.

When the photographer next encounters a subject which is not back-lit, or where the ambient light at the scene has an intensity greater than ten candles/ft$^2$, he may leave the source in the second position or alternatively manually rotate the source of artificial illumination 12 in a clockwise direction from the second position (broken line position in FIG. 1) to the first position (solid line in FIG. 1). As the source 12 nears the first position, a free end 52 of the latched plate 46 engages an inclined surface 54 of the latch 42 and cams the end of the latch 42 upwardly until it clears the latter. At this point, the resiliency of the latch 42 returns it to its original position in latching engagement with the latch plate 46, as shown in FIG. 1a.

Figure 2:
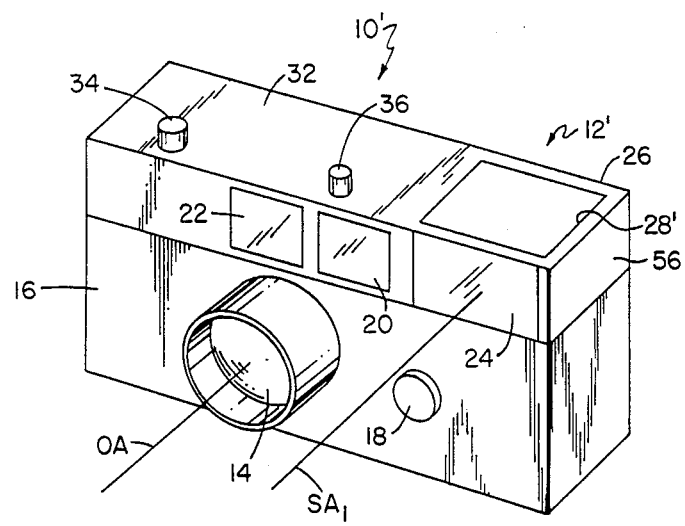
FIG. 2 is a perspective view of an alternative embodiment of the invention showing a source of artificial illumination in a first operative position.
Figure 3:
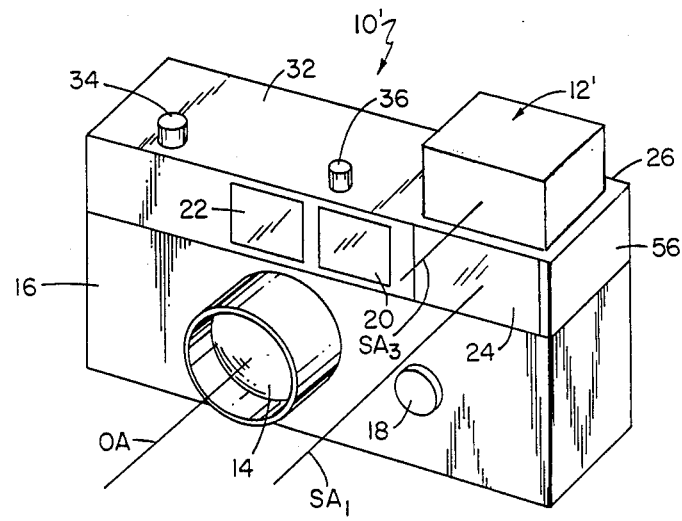
FIG. 3 is a view similar to that of FIG. 2 showing the source of artificial illumination in a second operative position.
Figure 4:
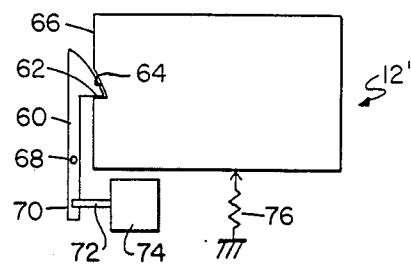
FIG. 4 is a schematic representation similar to FIG. 1a depicting a solenoid controlled latch for releasably maintaining the source of artificial illumination in its first position.
Figure 5:
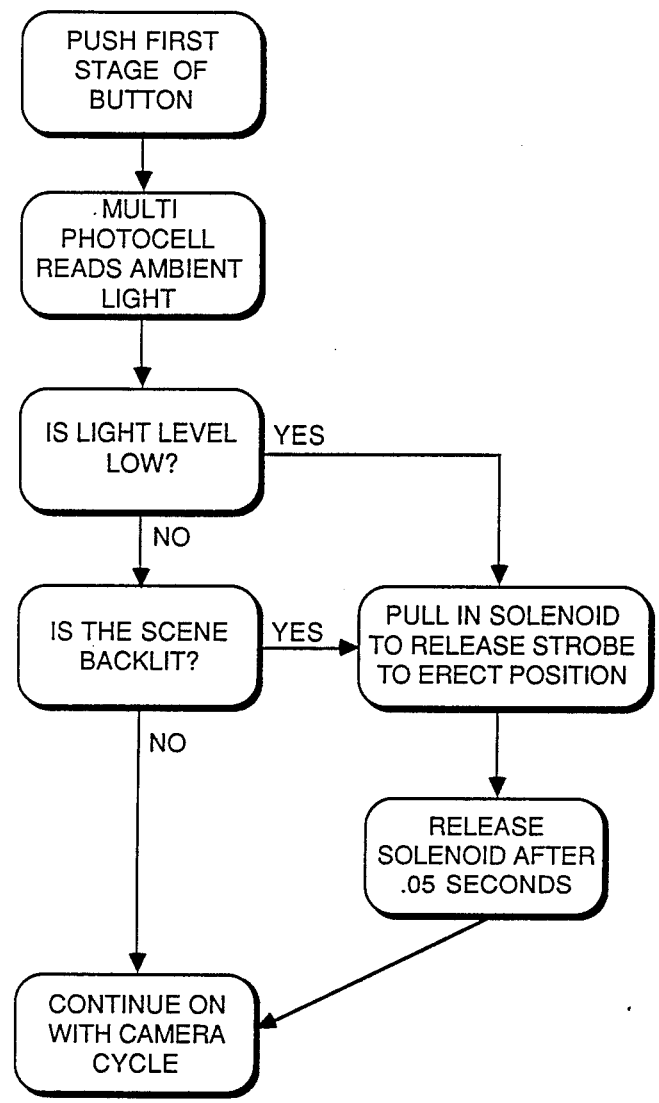
FIG. 5. is a block diagram which depicts the operation of the instant invention.

An alternative embodiment of the invention is shown in FIGS. 2-4 of the drawings. This embodiment features a camera 10' which is substantially identical with the camera 10 except (1) its chamber 28' for receiving the source of artificial illumination 12' is closed on its right end, as viewed in FIG. 2, by an end wall 56, and (2) it has a slightly modified latching arrangement for the source 12'. FIG. 2 shows the source of artificial illumination in its first position whereas FIG. 3 shows it in its second position wherein its axis of illumination $SA_3$ is spaced further from the optical axis OA of the camera 10' than it is when in its first position. The source of artificial illumination 12' is releasably maintained in its first position by a resilient latch 60 having an end 62 which is adapted to be received by a recess 64 in a sidewall 66 of the source 12'. The latch 60 is pivotally mounted to camera structure via a pin 68 and has an end 70 connected to a reciprocally mounted arm 62 of a solenoid 74.

As in the preferred embodiment, the solenoid 74 is adapted to be momentarily energized when the button 34 enters its first stage (partially depressed) whenever the scene to be photographed is back-lit or its ambient light intensity is below ten candles/ft$^2$. Energizing the solenoid 74 results in the arm 72 being partially withdrawn into the solenoid 74 thus removing the end 62 of the latch 60 from the recess 64 in the source 12'. Thus unlatched, the source 12' is moved linearly by a spring 76 from its first position, wherein it is located wholly within the confines of the walls of the camera 10', to its second position wherein it is substantially fully withdrawn from the recess 28'. When it is desired to return the source of artificial illumination 12' to its first position, the photographer merely pushes downwardly on the source 12'. This action results in the end wall 66 of the source 12' camming the upper end of the latch 60 slightly to the left until the end 64 "sees" and enters the recess 64. The latch 60, as well as latch 42, may be formed from any suitable resilient material that will enable it to give or bend without transferring any substantial force to the actuating member of its associated solenoid.

Since certain changes may be made in the above-described invention without departing from the scope thereof, it is intended that all matter contained in the above description or shown in the accompanying drawings shall be interpreted as illustrative and not in a limiting sense.

What is claimed is:

1. A photographic camera comprising:
    a housing;
    an objective lens mounted in a wall of said housing for directing image-bearing light toward a film unit supported at a focal plane within said housing, said objective lens having an optical axis which defines a first axis;
    means for initiating a photographic exposure cycle;
    means for measuring the intensity of ambient light reflected from a scene; and
    a source of artificial illumination having a second axis along which artificial illumination is directed toward the scene to be photographed subsequent to actuation of said initiating means, said source being mounted for automatic movement from a first position, wherein said first and second axes are relatively close, for illuminating the scene when said measuring means records an ambient light level being reflected from the scene which exceeds a predetermined value, to a second position, in which the distance between said first and second axes is greater than in said first position, for illuminating the scene when said measuring means records an ambient light level being reflected from the scene which is less than said predetermined value, the intensity of the illumination being directed toward the scene being greater in said second position than in said first position.

2. A photographic camera as defined in claim 1 wherein said housing includes a means for defining a recess for nestably receiving said source of artificial illumination within the contour of said housing when in said first position.

3. A photographic camera as defined in claim 2 wherein said means for defining a recess includes a light transmitting wall.

4. A photographic camera as defined in claim 3 wherein said light transmitting wall is translucent.

5. A photographic camera as defined in claim 2 further including latching means for releasably maintaining said source of artificial illumination in said first position.

6. A photographic camera as defined in claim 5 further including a solenoid energizable for moving said latching means to a release position when said measuring means records an ambient light level being reflected from the scene which is less than said predetermined value.

7. A photographic camera as defined in claim 1 wherein said source of artificial illumination is mounted for pivotal movement about an axis substantially parallel with said first axis during its movement between said first and second positions.

8. A photographic camera as defined in claim 1 wherein said first and second axes are generally parallel with each other when said source of artificial illumination is in either of said first or second positions.

9. A photographic camera as defined in claim 8 wherein said source of artificial illumination is mounted for linear movement between said first and second positions.

10. A photographic camera as defined in claim 1 wherein said source of artificial illumination is mounted for automatic movement from said first position to said second position whenever said measuring means records an ambient light scene in which the illumination of the background of the scene is substantially equal to or greater than that of the foreground.

11. A photographic camera as defined in claim 10 wherein said housing includes means for defining a recess for nestably receiving said source of artificial illumination within the contour of said housing when in said first position.

12. A photographic camera as defined in claim 11 wherein said means for defining a recess includes a light transmitting wall.

13. A photographic camera as defined in claim 12 wherein said light transmitting wall is translucent.

14. A photographic camera as defined in claim 11 further including latching means for releasably maintaining said source of artificial illumination in said first position.

15. A photographic camera as defined in claim 14 further including a solenoid energizable for moving said latching means to a release position when said measuring means records an ambient light level being reflected from the scene which is less than said predetermined value or the illumination of the background of the scene is substantially equal to or greater than that of the foreground.

16. A photographic camera as defined in claim 10 wherein said source of artificial illumination is mounted for pivotal movement about an axis substantially parallel with said first axis during its movement between said first and second positions.

17. A photographic camera as defined in claim 10 wherein said first and second axes are generally parallel with each other when said source of artificial illumination is in either of said first or second positions.

18. A photographic camera as defined in claim 17 wherein said source of artificial illumination is mounted for linear movement between said first and second positions.

* * * * *